United States Patent [19]

Cloutier et al.

[11] Patent Number: 4,528,577

[45] Date of Patent: Jul. 9, 1985

[54] INK JET ORIFICE PLATE HAVING INTEGRAL SEPARATORS

[75] Inventors: Frank L. Cloutier; Robert N. Low, both of Corvallis; Paul H. McClelland, Monmouth; Niels J. Nielsen, Corvallis, all of Oreg.

[73] Assignee: Hewlett-Packard Co., Palo Alto, Calif.

[21] Appl. No.: 443,980

[22] Filed: Nov. 23, 1982

[51] Int. Cl.[3] ............................................ G01D 15/18

[52] U.S. Cl. .................................. 346/140 R; 204/11; 204/15

[58] Field of Search ................. 346/140 R; 204/9, 11, 204/15, 17

[56] References Cited

U.S. PATENT DOCUMENTS

| | | | |
|---|---|---|---|
| 4,229,265 | 10/1980 | Kenworthy | 204/11 |
| 4,246,076 | 1/1981 | Gardner | 204/11 |
| 4,296,421 | 10/1981 | Hara | 346/140 R |
| 4,374,707 | 2/1983 | Pollack | 204/11 |
| 4,412,224 | 10/1983 | Sugitani | 346/140 R X |

*Primary Examiner*—Joseph W. Hartary

*Attorney, Agent, or Firm*—William H. MacAllister

[57] ABSTRACT

An orifice plate is provided of an electroformed material which incorporates an integral ink distribution manifold and integral hydraulic separators between orifices. The general approach to the method of making the orifice plate is to first construct a two-part mandrel made up of a "hard" mandrel which can be reused many times and a "soft" mandrel which is renewed each time the mandrel is used. Typically, the surface of the "hard" mandrel is configured by mask and etch techniques, or by mask and electroplate techniques to define the ink distribution manifold and the hydraulic separators, while the "soft" mandrel is configured by mask and develop techniques to define the orifices and edges between orifice plates. Upon completion of the mandrel, its surface is electroplated with a relatively uniform thickness of metal, and the newly electroplated surface having the orifice plates patterned therein is separated from the mandrel.

1 Claim, 5 Drawing Figures

INK JET ORIFICE PLATE HAVING INTEGRAL SEPARATORS

BACKGROUND OF THE INVENTION

This invention relates to a new type of orifice plate for use in bubble-driven ink jet print heads and a method of manufacture.

The background with regard to bubble-driven ink jet printing is adequately represented by U.S. application Ser. No. 292,841 now abandoned by Vaught, et al., assigned to Hewlett-Packard Company, and by the following U.S. patents assigned to Canon Kabushiki Kaisha, Tokyo, Japan: U.S. Pat. Nos. 4,243,994; 4,296,421; 4,251,824; 4,313,124; 4,325,735; 4,330,787; 4,334,234; 4,335,389; 4,336,548; 4,338,611; 4,339,762; and 4,345,262. The basic concept there disclosed is a device having an ink-containing capillary, an orifice plate with an orifice for ejecting ink, and an ink heating mechanism, generally a resistor, in close proximity to the orifice. In operation, the ink heating mechanism is quickly heated, transferring a significant amount of energy to the ink, thereby vaporizing a small portion of the ink and producing a bubble in the capillary. This in turn creates a pressure wave which propels an ink droplet or droplets from the orifice onto a closeby writing surface. By controlling the energy transfer to the ink, the bubble quickly collapses before any ink vapor can escape from the orifice.

In each of the above references, however, the orifice plates disclosed typically provide only orifices and ink capillaries. The rest of the print head is constructed separately to provide independent structures for holding ink for distribution to the capillaries, and hydraulic separation between orifices is provided by having completely separate capillary channels or by constructing independent separators between orifices. None of the above references disclose a one-piece orifice plate having both an ink distribution manifold and hydraulic isolation between orifices or a method of making such an orifice plate which is both precise and inexpensive.

SUMMARY OF THE INVENTION

In accordance with the preferred embodiment, an orifice plate is provided of an electroformed material which incorporates an integral ink distribution manifold and integral hydraulic separators between orifices. The general approach to the method of making the orifice plate is to first construct a two-part mandrel made up of a "hard" mandrel which can be reused many times and a "soft" mandrel which is renewed each time the mandrel is used. Typically, the surface of the "hard" mandrel is configured by mask and etch techniques, or by mask and electroplate techniques to define the ink distribution manifold and the hydraulic separators, while the "soft" mandrel is configured by mask and develop techniques to define the orifices and edges between orifice plates.

Upon completion of the mandrel, its surface is electroplated with a relatively uniform thickness of metal. Then the electroplated surface is separated from the mandrel, and is aligned with and attached to a substrate having a corresponding number of resistors to create a sandwich having a number of bubble-driven ink jet print heads. The various print heads comprising sheet are then separated into individual units.

DETAILED DESCRIPTION OF THE INVENTION

Figure 1:
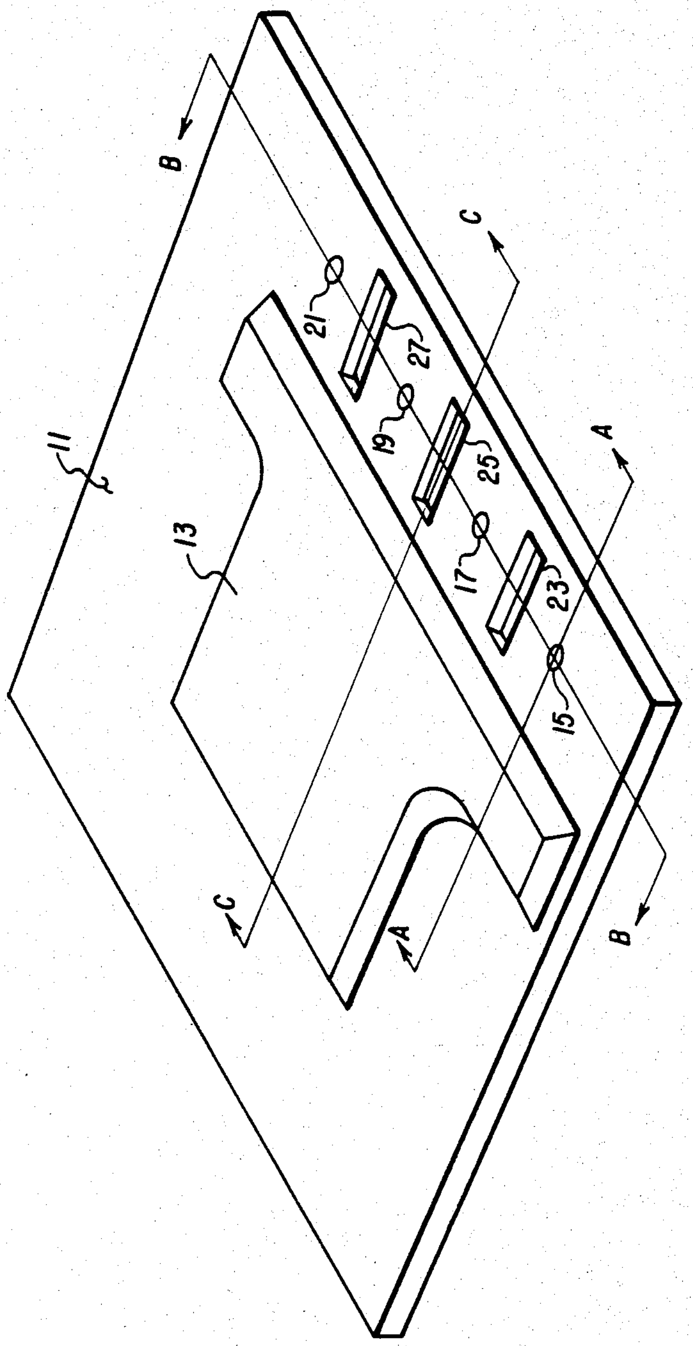
FIG. 1 shows one embodiment of an orifice plate according to the invention.

In accordance with the preferred embodiment of the invention, shown in FIG. 1 is an example of an orifice plate 11 having an integral ink distribution manifold 13; a plurality of orifices 15, 17, 19, and 21; and a plurality of integral hydraulic separators 23, 25, and 27 for inhibiting cross-talk between orifices.

Figure 2:
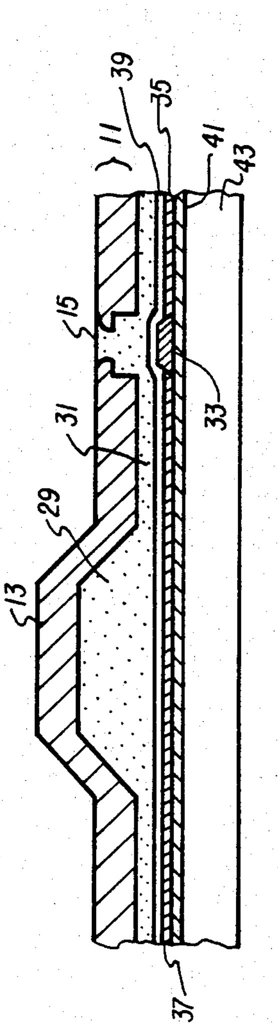
FIG. 2 shows a cross-section of a thermal ink jet print head through a particular orifice illustrating the relationship of the integral ink distribution manifold to the rest of the print head.

FIG. 2 corresponds to a cut A, shown in FIG. 1, through orifice plate 11, as it appears in a completed thermal ink jet print head. As illustrated, manifold 13 provides a nearby reservoir of ink 29 for quickly supplying ink through a short capillary channel 31 to the vicinity of orifice 15. Although the length of channel 31 can vary widely, generally the shorter the channel the faster the refill at the orifice. If the channel is too short, however, it defeats the purpose of the hydraulic separators. To optimize the operating characteristics of the ink jet subject to these competing constraints, the length of channel 31 is typically between 20 mils and 30 mils. Thermal power for the ink jet is supplied by a resistor 33 which is fed electrically by conductors 35 and 37. Typically, a thin layer 39 of passivating material such as silicon dioxide overlies resistor 33 and conductors 35 and 37. Generally, the separation between passivating layer 39 and orifice plate 11 which defines channel 31 is between 1 and 2 mils, except in the region of the manifold which is generally between 2.5 and 5 mils. Also, a heat control layer 41 is generally used between resistor 33 and substrate 43, in order to establish the desired speed of bubble collapse. Typical materials and thicknesses for heat control layer 41 vary depending on the particular substrate used. As an example, for a Si, ceramic, or metal substrate, a customary material for the heat control layer would be $SiO_2$ with a thickness in the range of 3 to 5 microns.

Figure 3:
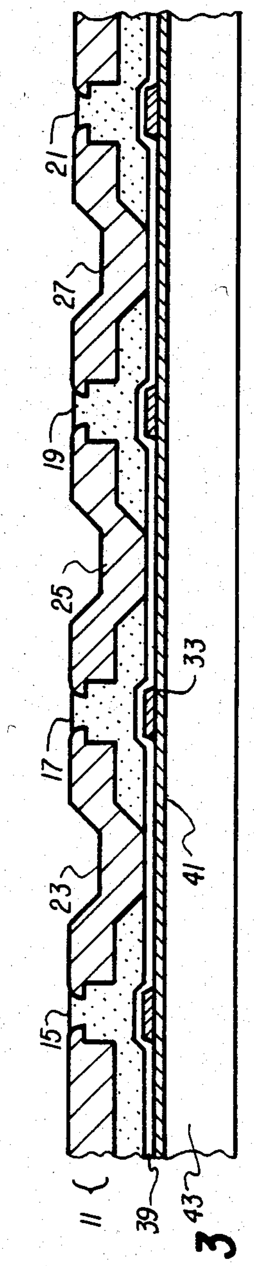
FIG. 3 shows a cross-section of a thermal ink jet print head illustrating the relationship of the hydraulic separators to the rest of the print head.
Figure 4:
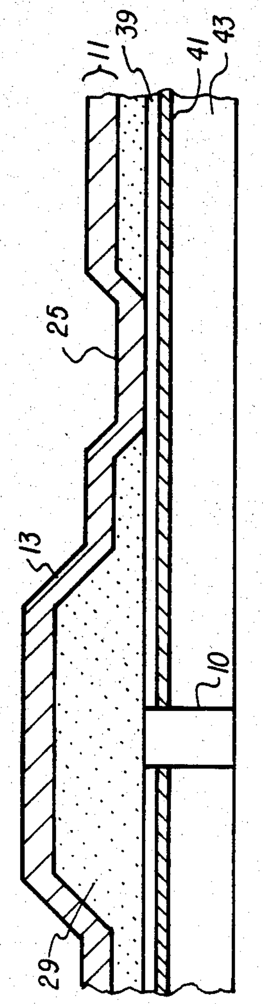
FIG. 4 shows another cross-section of a thermal ink jet print head illustrating the relationship between the ink distribution manifold and the hydraulic separators.

FIGS. 3 and 4 illustrate the nature of hydraulic separators 23, 25, and 27. FIG. 3 corresponds to a cut B, shown in FIG. 1, through orifice plate 11, again as it appears in a completed thermal ink jet print head. Similarly, FIG. 4 corresponds to a cut C through the orifice plate. As shown, hydraulic separators 23, 25, and 27 extend from orifice plate 11, down between each resistor and make contact with passivating layer 39, to block the direct paths between resistors of shock waves emanating from the various resistor locations. Also shown is an ink feed channel 10 for supplying ink to the manifold.

Figure 5:
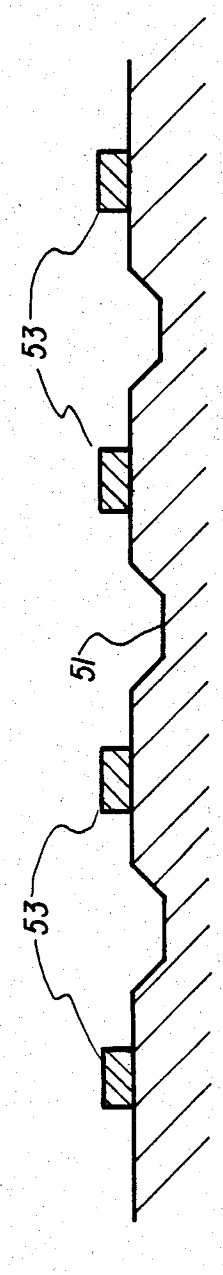
FIG. 5 shows a cross-section of the mandrel used to construct the orifice plate.

The general approach to the method of making orifice plate 11 is to construct a mandrel with the shape desired for orifice plate 11, then to electrodeposit metals or alloys onto the mandrel, and finally to separate the electrodeposited orifice plate 11 from the mandrel. Typical materials to be used for electroforming orifice plate 11 include nearly any plateable metal, e.g., including nickel, cooper, beryllium-copper, tin, and alloy 42. Shown in FIG. 5 is a cross-section of a typical mandrel used for this purpose which corresponds to cut B in FIG. 1. The mandrel is a composite system made up of a permanent "hard" mandrel 51 and a renewable "soft" mandrel 53. The "hard" mandrel defines the inner surface of the orifice plate including the hydraulic separators and the ink manifold, and the "soft" mandrel defines the orifices. Optimally, to reduce costs, mandrel 51 should be made of a material which can be reused many times (preferably at least 50 times) and should itself be relatively inexpensive to produce.

Typical materials for "hard" mandrel 51 which meet these requirements include metal or metal alloy sheets, for example, copper, brass, beryllium copper, nickel, molybdenum stainless steels, titanium, and others; also included are composite or laminated materials such as copper clad metals or metal clad fiber reinforced plastics such as those used in circuit board laminates.

A method according to the invention which is adapted to producing mandrel 51 is to mask appropriate areas to define distribution manifold 13 and hydraulic separators 23, 25, and 27, and then to etch to remove material and/or electroplate to add material where needed. These methods are best understood by the specific examples described below.

EXAMPLE 1

Using a starting material of precision ground and lapped 304L stainless steel sheet stock, a characteristic sequence of processes is to:

1. Mask the surface of the sheet to define the pattern desired for ink distribution manifold 13. Although other techniques such as physical masks can be used, typical IC processing technology appears to furnish the optimum solution to the masking problem on stainless steel. In this example, conventional IC processing steps are as follows:
   (a) Apply a photosensitive emulsion (e.g., a positive photoresist such as Shipley AZ119S to the sheet.
   (b) Prebake to harden the emulsion.
   (c) Expose the pattern desired for ink distribution manifold 13.
   (d) Develop the resist image.
2. Etch the unmasked surface, thereby providing a protrusion on the sheet having the shape of the manifold.
3. Mask the sheet again to define the pattern desired for the hydraulic separators (typically using a positive photoresist such as AZ119S above, and following substantially the same steps as described in step 1 above).
4. Etch the unmasked surface to leave depressions in the sheet which correspond to the hydraulic separators.

Somewhat different steps are used if the starting surface is a composite or a laminated material, since typically the metal cladding on these materials is often not very thick. Working with these materials is illustrated in examples 2 and 3 below.

EXAMPLE 2

Using a starting material of copper-clad fiberglass reinforced epoxy sheeting (printed circuit board laminate), a characteristic sequence of processes is to:

1. Mask the surface of the sheet to define the hydraulic separators.
2. Etch the copper leaving depressions in the surface corresponding to the hydraulic separators.
3. Mask the surface to define the ink manifold.
4. Electroplate copper onto the surface to form a protrusion having the shape of the ink manifold.
5. Overplate the surfaces with electroless nickel to form a release surface to promote the later separation between mandrel 51 and orifice plate 11.

EXAMPLE 3

Using a starting material of copper-clad fiberglass epoxy sheeting (printed circuit board laminate), a characteristic sequence of processes is to:

1. Mask the surface of the sheet to define the hydraulic separators.
2. Electroplate copper to increase the general thickness of the copper cladding leaving depressions corresponding to the hydraulic separators.
3. Mask the surface to define the ink manifold.
4. Electroplate copper to form a protrusion on the surface corresponding to the ink manifold.
5. Electroplate nickel at low current density to form a release surface (or step 5 in Example 2 above).

Following construction of "hard" mandrel 51, "soft" mandrel 53 can then be formed on its surface. "Soft" mandrel 53 is typically formed of photo-imageable nonconductive plastics or dry film photo-resists, the specific shape corresponding to the orifices customarily being right circular cylinders approximately 1.8 mils high and approximately 3.2 mils in diameter and are formed by standard mask and develop techniques similar to those described above.

It is also quite easy to photo-define the desired edge boundaries for orifice plate 11 with "soft" mandrel 53 at the same time that the orifice masks are being formed. Thus, instead of making "hard" mandrel 51 suitable for only one orifice plate, it is much more economical to make a large "hard" mandrel suitably defined for a large number of orifice plates. Then, the corresponding "soft" mandrel can also be made large enough for a large number of orifice plates and, at the same time, by incorporating the desired edge boundaries into the pattern defined by "soft" mandrel 53, the various orifice plates formed can be easily separated.

Following construction of mandrels 51 and 53, the entire composite surface is electroplated with a suitable metal such as nickel, typically to a thickness of approximately 1.0 to 4.0 mils, with optimal size approximately 2.2 mils. This thickness is usually chosen so that the electroplated metal extends somewhat above the height of "soft" mandrel 53 in order to cause slight overlapping of the soft mandrel. (Since "soft" mandrel 53 is a non-conductor it does not plate.) This overlapping reduces the orifice size so that it is somewhat smaller than the diameter of "soft" mandrel 53 (see FIGS. 2 and 3) and the resulting orifice shape promotes better droplet definition. Typical orifice sizes range from 1.8 to 4.0 mils, with an optimal size being approximately 2.5 mils.

After electroplating, the newly formed orifice plates are separated from the mandrel in the form of a sheet. The sheet is then aligned with and attached to a substrate having a corresponding number of resistors to create a sandwich having a number of bubble-driven ink jet print heads. The various print heads comprising the sheet are then separated into individual units.

What is claimed is:

1. A thermal ink jet printhead comprising:

(1) A planar substrate member;

(2) A heat control layer disposed on said substrate member;

(3) A plurality of resistive elements disposed on said heat control layer;

(4) A plurality of electrical conductors disposed on said heat control layer and electrically connected to said resistive elements;

(5) A thin metallic planar sheet having:

(A) A plurality of orifices formed therein and disposed in a row, there being an orifice for each of said resistive elements;

(B) A plurality of integral barrier portions between said orifices and extending toward said heat control layer;

(C) An integral ink distribution manifold portion adjacent said row of orifices and said barrier portions and extending away from said heat control layer; and (6) Means for securing said planar sheet to said substrate member with said orifices being in registration with said resistive elements, said barrier portions forming a plurality of ink supply channels from said manifold portion to said orifices.

* * * * *